US006947898B2

(12) United States Patent
Postrel

(10) Patent No.: US 6,947,898 B2
(45) Date of Patent: Sep. 20, 2005

(54) SYSTEM FOR ELECTRONIC BARTER, TRADING AND REDEEMING POINTS ACCUMULATED IN FREQUENT USE REWARD PROGRAMS

(75) Inventor: Richard Postrel, Miami Beach, FL (US)

(73) Assignee: Signature Systems, LLC, Miami Beach, FL (US)

(*) Notice: Subject to any disclaimer, the term of this patent is extended or adjusted under 35 U.S.C. 154(b) by 263 days.

(21) Appl. No.: 10/601,317

(22) Filed: Jun. 20, 2003

(65) Prior Publication Data

US 2005/0060225 A1 Mar. 17, 2005

Related U.S. Application Data

(63) Continuation of application No. 09/602,222, filed on Jun. 23, 2000, now Pat. No. 6,594,640.
(60) Provisional application No. 60/140,603, filed on Jun. 23, 1999.

(51) Int. Cl.[7] .............................................. G06F 17/60
(52) U.S. Cl. ........................................................ 705/14
(58) Field of Search .............................. 705/1, 10, 14, 705/26

(56) References Cited

U.S. PATENT DOCUMENTS

| | | | | | |
|---|---|---|---|---|---|
| 5,806,045 | A | * | 9/1998 | Biorge et al. ................ | 235/380 |
| 5,923,016 | A | * | 7/1999 | Fredregill et al. .......... | 235/375 |
| 5,991,736 | A | * | 11/1999 | Ferguson et al. ............ | 705/14 |
| 6,049,778 | A | * | 4/2000 | Walker et al. ................ | 705/14 |
| 6,061,660 | A | * | 5/2000 | Eggleston et al. ........... | 705/14 |
| 6,128,599 | A | * | 10/2000 | Walker et al. .............. | 235/380 |
| 6,370,514 | B1 | * | 4/2002 | Messner ....................... | 705/14 |
| 6,594,640 | B1 | * | 7/2003 | Postrel ......................... | 705/14 |
| 2002/0116257 | A1 | * | 8/2002 | Helbig ......................... | 705/14 |
| 2003/0182218 | A1 | * | 9/2003 | Blagg .......................... | 705/35 |

FOREIGN PATENT DOCUMENTS

| | | | | |
|---|---|---|---|---|
| EP | 0917420 A2 | * | 5/1999 | .......... G07F/19/00 |
| WO | WO 01/01278 A2 | * | 1/2001 | .......... G06F/17/00 |

OTHER PUBLICATIONS

Information about the MyPoints™ Program retrieved on Jul. 26, 2002 from Internet <URL:http://web.archive.org/web/19980128231040/http://www.mypoints.com>. This web site was archived by web.archive.org on Jan. 28, 1998.*

(Continued)

Primary Examiner—Susanna M. Diaz
(74) Attorney, Agent, or Firm—Anthony R, Barkume, P.C.

(57) ABSTRACT

A system and method for operating a reward points accumulation and redemption program wherein a user earns reward points from a plurality of independent reward points issuing entities, with each tracking the user's earned reward points in a user reward point account stored on a rewards server (such as a frequent flyer account or a credit card loyalty account). A trading server accumulates some or all of the user's earned reward points from the reward servers and credits the accumulated points into a single reward exchange account associated with the user. The user may then select an item for purchase with the accumulated reward points. The item is provided to the user in exchange for a subset or all of the reward points.

48 Claims, 8 Drawing Sheets

OTHER PUBLICATIONS

Oberndorf, Shannon. "Points for Loyalty." Catalog Age, vol. 14, No. 13, pp. 35, 38, Dec. 1997.*

Riedman, Patricia. "MyPoints Aims to Be Universal Web Currency." Advertising Age, vol. 68, No. 33, p. 17, Aug. 18, 1997.*

"World's First Smart Card Frequent Flyer Scheme Debuts." Newsbytes News Network, Sep. 19, 1997.*

"Major Airlines Continue Their Smart Card Fly-bys." Card Technology, p. 6+, Jan. 1998.*

"Schlumberger: AOM's Smart Card Frequent Flyer Program Successfully Launched." M2 Presswire, May 22, 1998.*

"Chip Cards Get a Loyal Corporate Following." Card Technology, pp. 25–30, May 1999.*

"Transmedia Europe, Inc. and Transmedia Asia Pacific, Inc. Accounce the Acquisition of a Silicon Valley Internet Loyalty and Member Benefit Provider." PR Newswire, p. 716HSTH034, Jul. 16, 1998.*

* cited by examiner

Account: John Doe
Account Number: 123456789
Enrollment Date: 12-21-1995
Privilege Card Type: Preferred
Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | Y | 2300 |
| 05-18-1999 | Flight | LGA | LAX | Y | 801 | Y | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG. 3  PRIOR ART

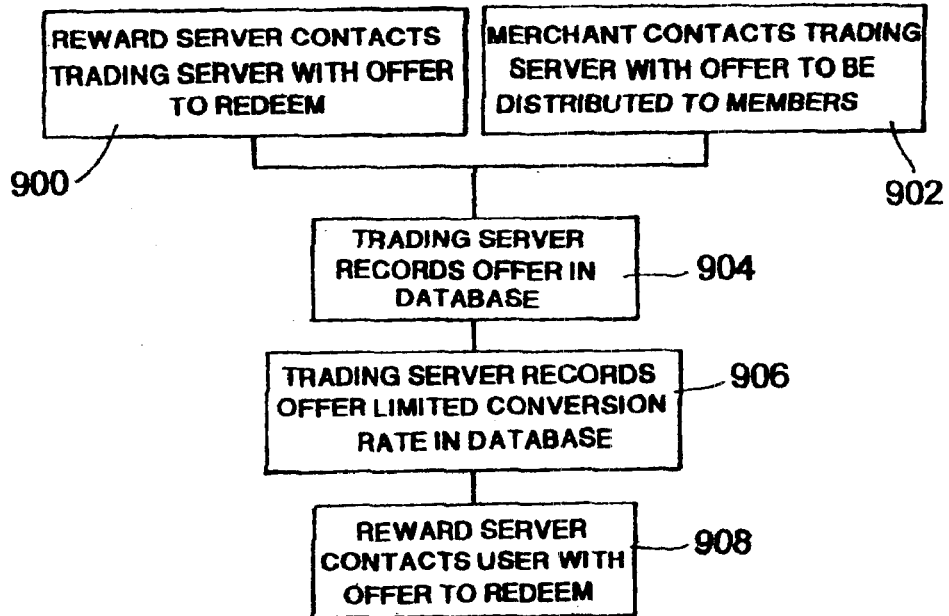
FIG.9
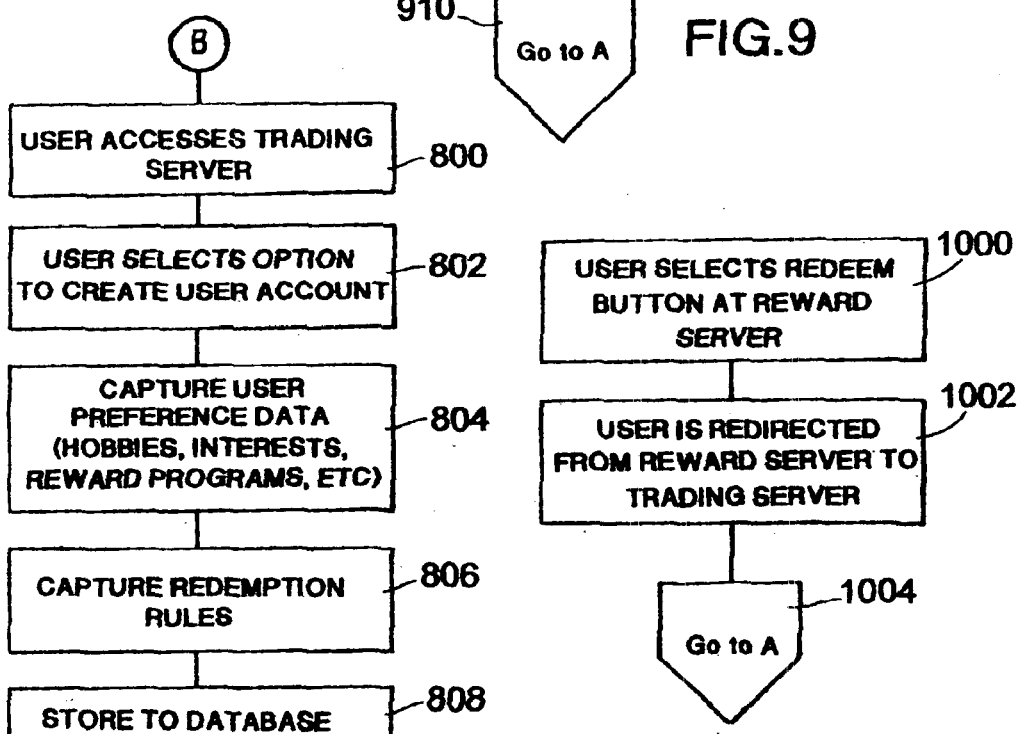
FIG.8
FIG.10

SYSTEM FOR ELECTRONIC BARTER, TRADING AND REDEEMING POINTS ACCUMULATED IN FREQUENT USE REWARD PROGRAMS

CROSS-REFERENCE TO OTHER APPLICATIONS

This application is a continuation application of application Ser. No. 09/602,222, filed Jun. 23, 2000, now U.S. Pat. No. 6,594,640, which is based on and claims filing priority of co-pending U.S. provisional patent application Ser. No. 60/140,603, filed on Jun. 23, 1999.

BACKGROUND OF THE INVENTION

The present invention relates to electronic bartering systems that allow users to trade or redeem reward points, such as those already accumulated in airline frequent flyer programs, into an account for redeeming products and services offered over the Internet. This would allow users to use their frequent flyer (or frequent car rental, frequent dining, etc.) points for products or services other than those typically offered by the point sponsor. The points would be sold back to the airline (or other type of issuing entity). The system would also allow for purchase by users of points traded in by other users, such that points are redistributed without incurring a transaction directly with the airline or other issuing entity. The system also allows for manufacturers and producers of goods to put overstocked or discontinued, end of run products into a liquidation process that can be exchanged for points.

In order to attract and retain business customers, airlines, hotels, car rental companies, chain retailers, telecom providers, etc. have historically introduced frequent use programs that offer awards of "frequent flyer miles" or other such incentives schemes based on the distance traveled or use by that customer. Competition has forced airlines to modify the manner in which mileage was acquired to include travel related purchases by consumers. For example, the dollar-based cost of a ticket purchased may be awarded as mileage to a client account. Within the past several years, credit card companies or other retailers and etailers have co-branded credit cards in the name of the airlines and the credit card company where each dollar spent using the card is recorded as a mile of travel or point in the award program. These cards may additionally award bonus miles in coordination with user purchases of preferred products or flights during preferred times.

U.S. Pat. No. 5,774,870, FULLY INTEGRATED, ON-LINE INTERACTIVE FREQUENCY AND AWARD REDEMPTION PROGRAM, issued to Netcentives, Inc. on Jun. 30, 1998. The '870 patent provides a system whereby the user can make purchase of products over the Internet and receive award points, which are stored in an associated database. The user can subsequently view an award catalog to determine which awards he may be able to redeem based on the number of points in his account. This patent does not teach, however, the ability of a user to trade-in his points accumulated in a pre-existing frequent flyer account in order to make purchases of products from the award catalog or allow the points to be pooled with other programs in order to gain further purchasing power.

The ClickRewards program site appears to operate in the same fashion as that described in the '870 patent; i.e. it allows users to gain points (called "ClickMiles") for making an online purchase of a product through an associated web site. For example, ClickMiles may be awarded for a purchase of Gap products at the Gap web site. The ClickMiles can ultimately be redeemed for frequent flyer miles, for example at one of several major airlines. Another web site, www.webflyer.com, is associated with ClickRewards and provides ClickMiles for purchasing frequent flyer-related goods, such as guidebooks.

The ClickMiles Reward Catalog allows the user to redeem the ClickMiles for merchandise in the alternative to frequent flyer miles. For example, a CD can be obtained from CDNow by redeeming 900 ClickMiles.

Although the ClickRewards program allows a user to redeem accumulated points for obtaining merchandise over the Internet, it does not allow for the redemption of frequent flyer miles from a pre-existing account to be traded for reward points.

U.S. Pat. No. 5,794,210, ATTENTION BROKERAGE, issued on Aug. 11, 1998 to CyberGold, Inc. The '210 patent describes a system that makes immediate payment to a user for paying attention to an advertisement or other "negatively priced" information distributed over the Internet. A special icon or other symbol displayed on a computer screen may represent compensation and allow users to choose whether they will view an ad or other negatively priced information and receive associated compensation. The points accumulated can then be used to purchase "positively priced information" or products.

The CyberGold web site, www.cybergold.com, describes an "earn and spend" community in which users earn "cash" online, for example by visiting a portal site. The earnings can then be used to make online purchases, such as software.

Again, although the '210 patent and the CyberGold web site describe an incentive system that allows users to purchase products or services over the Internet, neither teaches the ability of the redeeming frequent flyer miles from a pre-existing account for reward points.

U.S. Pat. No. 5,025,372, SYSTEM AND METHOD FOR ADMINISTRATION OF INCENTIVE AWARD PROGRAM THROUGH USE OF CREDIT, issued on Jun. 18, 1991 to Meridian Enterprises, Inc. The '372 patent describes an incentive award program in which credit is awarded to participants based on the participant meeting a designated level of performance under the system. This patent does not teach the ability to increase the reward points in a user's account by redeeming points from a pre-existing account such as a frequent flyer mileage program.

With regard to FIG. 1, a model of the frequent flyer systems of the prior art is presented. Two different airlines servers are shown surrounded by their related marketing partners, the first grouping labeled Airline 1 100 and the second independently operated but functionally similar grouping labeled Airline 2 200. In order to lure more business travelers, the airlines 100, 200 have established marketing agreements with travel related companies to provide the business traveler with a more robust way to generate rewards in the form or frequent flyer miles. These marketing arrangements or associations have typically involved credit card companies, phone companies, hotel chains and car rental companies. Any purchases made through these "co-branded" partners were then awarded to the user periodically. Bonus miles or points may additionally be accumulated based on the user's actions in response to offers made by the airline or in coordination with the partner company. For example, phone companies offer bonus miles to users based on the user's agreement to change phone service. These points are obtained by the partner companies by purchasing them from the issuing entity for redistribution as an incentive to utilize their particular goods and/or services. FIG. 2 shows some sample co-branded cards that are representative of marketing agreements between TWA, Sprint, and Mastercard. In order to receive these benefits, the user must sign up with each of the partner companies separately and provide the frequent flyer account number that is to receive the credited miles. A user either making phone calls or purchases in accordance with the agreements made with each of these partners will first accumulate a value on the partner's system which in turn is periodically updated on the airline server to reflect the value earned during that period. FIG. 3 is representative of a typical user account that shows various earnings in the system transferred in from any of the co-branded partners. The records of the table in FIG. 3 identify the source of the rewards, the dates they were recorded and the number of miles associated with that transaction. The user can view the accumulated miles by accessing the airline server or by tracking the individual value reported to the user through the various bills the user receives from each of the co-branded partners.

The prior art does not provide for a consumer to utilize relatively small amounts of reward points in any manner. In addition, a consumer often can only redeem points in an airline-related manner (i.e. to obtain a free ticket or upgrade from coach to first class). This prior art does not recognize the need for a consumer to exchange reward points for non-travel related goods, and in particular renders relatively small numbers of points useless. For example, a consumer that does not travel often may have 500 points in United Airlines, 700 points in USAir, and 1000 points in TWA, each of which is relatively useless in the prior art.

What is desired therefore, is a system where users may submit frequent flyer awards or credits accumulated for other types of transactions for redemption or translation into a form readily acceptable by a participating merchant. An exchange rate will be established for the relative consideration received by the companies involved in the transaction. A user should be able to pool the various earned rewards that may exist in currently separate server systems where the resulting combined value may be used by a user of the system to acquire items of equivalent value. In another embodiment, the award program looking to reduce frequent flyer liabilities may contact users and arrange for a transfer of the reward miles into a value (which may be predetermined) to be credited to the trading system reward. Alternatively, the points may be bid for in an auction environment where points may be used to bid for certain awards. A user who has earned frequent flyer miles or rewards on several sites insufficient to receive any direct value for their mileage may be able to pool the miles acquired from several different air carriers to transfer the awards accumulated to the system of this invention. The user may have the selected items delivered to the user by performing a purchase request by various means such as over the Internet, dialing a toll free number for placing an order, or any other means of placing an order that will accept payment from this system.

SUMMARY OF THE INVENTION

This invention allows a user to purchase goods or services using accumulated award points held by a variety of award programs. A frequent flyer program is typical of the systems to be encompassed by this invention. Tie-in promotions have been introduced over the past several years that have allowed purchases for goods and services such as hotel or car rentals to accumulate award miles that are then recorded on the airline award system. More recently credit card companies offer cards where a mile award is made for every dollar spent using that credit card. These cards may additionally award bonus miles in coordination with user purchases of preferred products.

A system and method are disclosed where the system allows the user to redeem the accumulated reward points from a plurality of reward entities for exchange with a merchant. The user requests process for redemption of the pre-accumulated reward points comprises the steps of the user requesting, via a user computer, a trading server computer to obtain reward points from a reward server associated with a rewarding entity with which the user has reward points. The reward server computer decreases the user's reward point account by the requested number of reward points. The reward server computer conveys consideration to the trading server computer, where the consideration corresponds to the number of reward points decreased in the account of the reward server. The trading server computer increases the reward exchange account on the trading server associated with the user by the requested number of points. The trading server receives the consideration from the reward server computer. Following or anticipating this conversion into the trading server, the user requests a purchase of an item from an associated merchant computer by selecting the item to be purchased from a plurality of available items. The trading server computer confirms that the user's reward exchange account contains sufficient points to purchase the selected item. The user may purchase additional points in the event that his account does not contain the requisite number of points for making the purchase transaction. The trading server computer requests the merchant computer to deliver the item to the user. The trading server decreases the user exchange account by the number of points corresponding to the purchased item and the trading server computer conveys consideration to the merchant computer equivalent to the required points. In another embodiment, the user may redeem rewards at the reward server following the selection of an item to be acquired. Policies may be established to automatically contact each of the reward servers according to a user procurement profile to transact the required payment. This profile may indicate the order of redemption and method of providing funds sufficient to cover the purchase after redeemable points are exhausted. After redemption the consideration is transferred to the respective merchant.

BRIEF DESCRIPTION OF THE DRAWING

FIG. 3. is a sample of the prior art reward summary from an airline frequent flyer system;

FIG. 8 is a data flow diagram of the user account creation process on the trading server;

FIG. 9 is a data flow diagram of the offer process by a reward program or by a merchant;

FIG. 10 is a data flow diagram of the process where a user may be redirected from a reward program to the trading server of the present invention.

DETAILED DESCRIPTION OF THE PREFERRED EMBODIMENT

Figure 4:
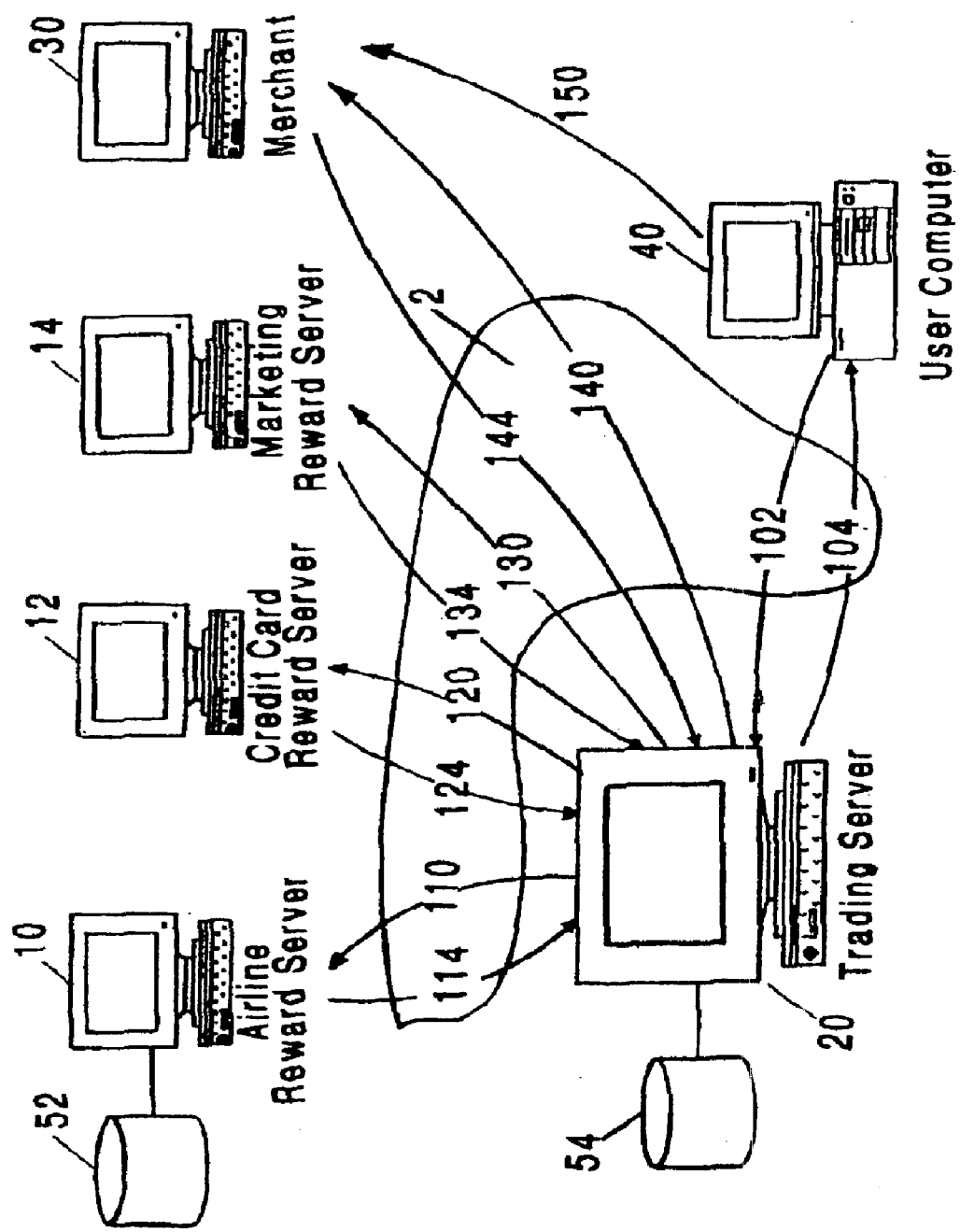
FIG. 4 is a block diagram of the components of the present invention.

With reference to FIG. 4, a plurality of reward server computers 10, 12, 14, a trading server 20, a merchant computer 30 and a user computer 40 are shown in communication with a network 2. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as offered by American Express where the user earns rewards based on purchases or an advertising based award program where the user earns rewards by selecting advertising content.

Figure 1:
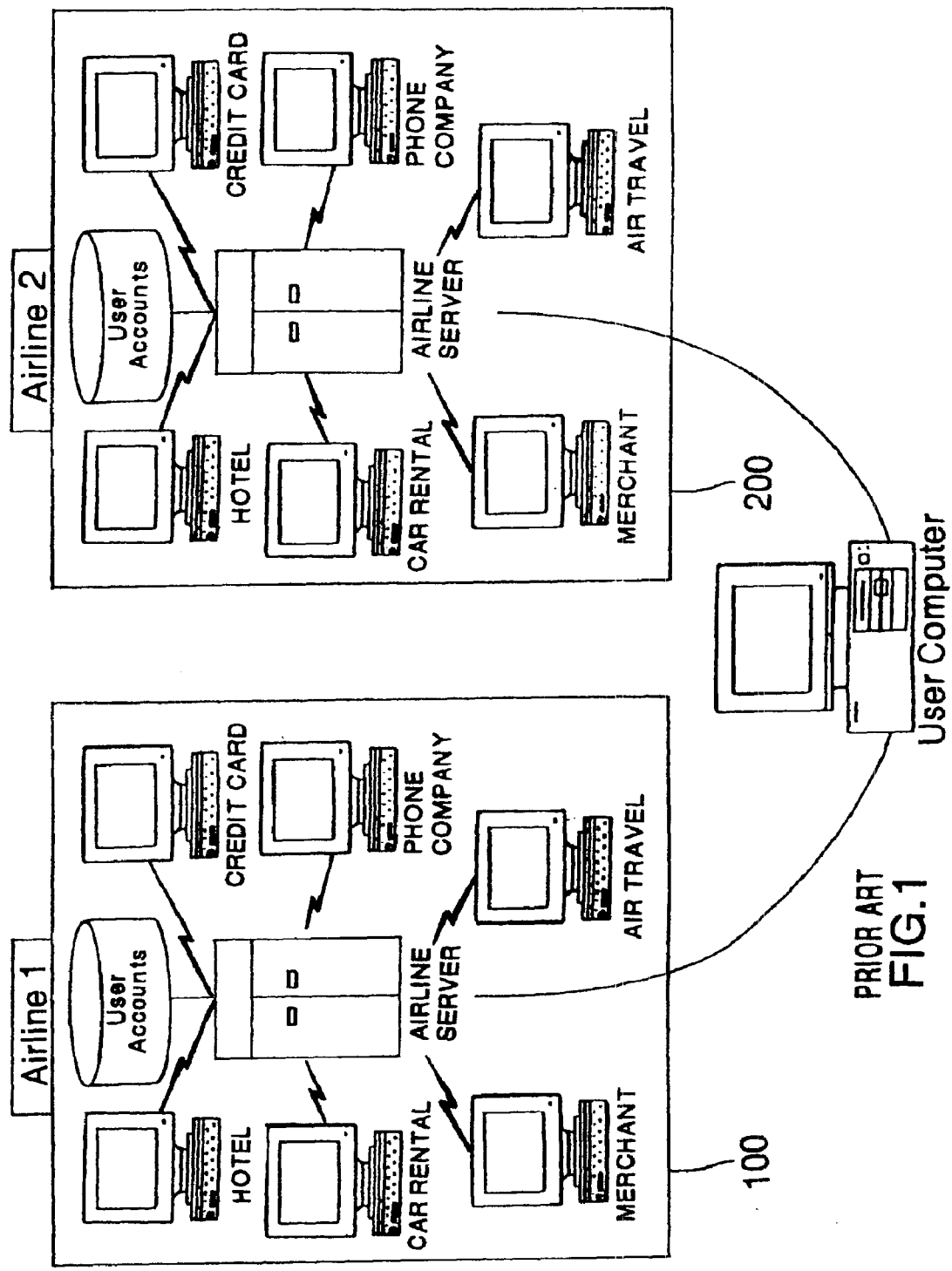
FIG. 1 is representative of the prior art marketing arrangements used in reward programs.
Figure 2:
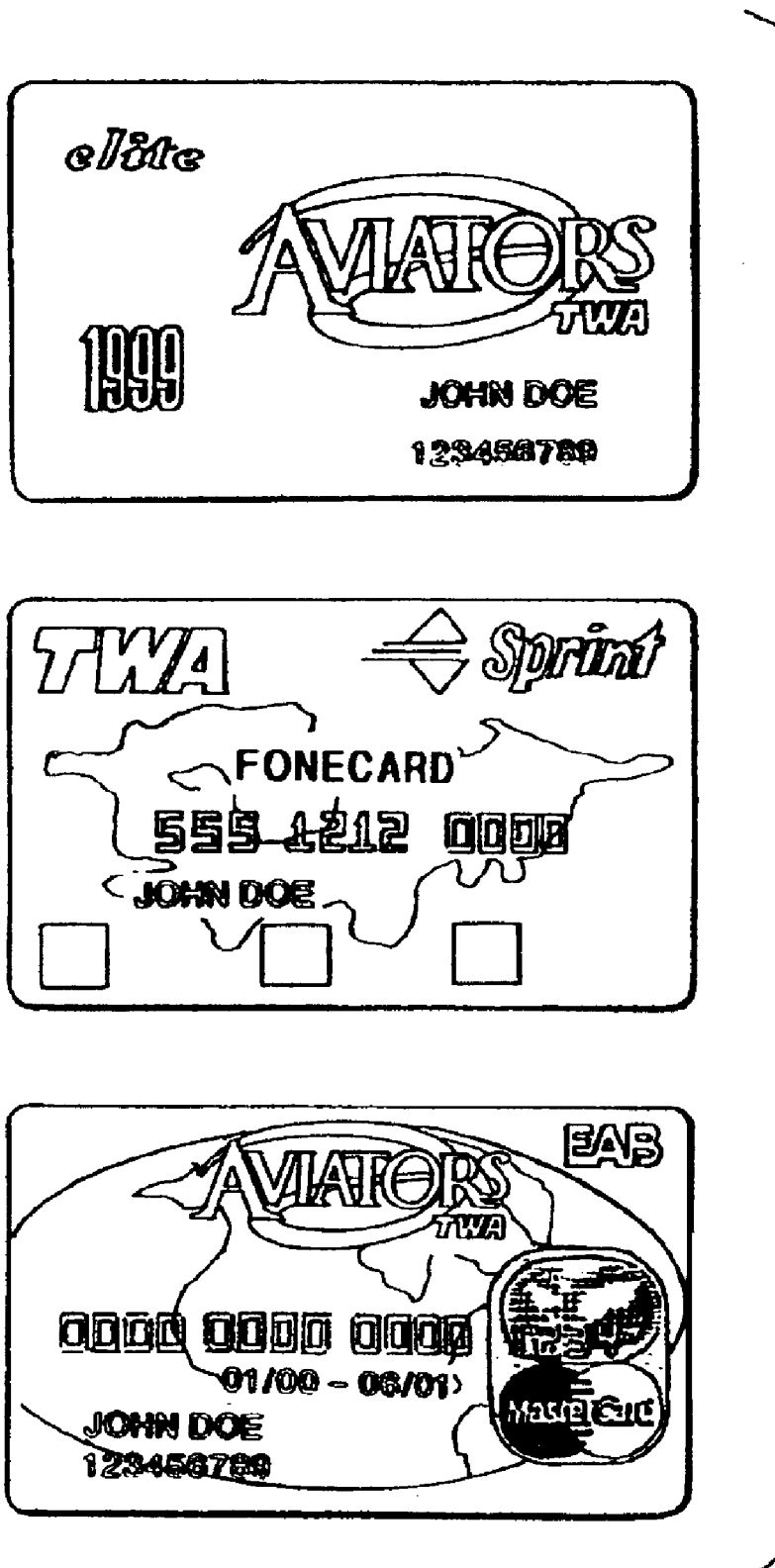
FIG. 2 is a representation of the co-branded partners in a prior art award program.

A user of this system may acquire and accumulate rewards through any prior art means such as shown on FIG. 1, which are then posted in a user's reward point account 52 that is accessible through the reward server computer 10. The trading server computer 20 is in communication through the network 2 with a user on a user computer 40 and is additionally able to connect to the reward server computers 10,12,14 through the network 2 in accordance with techniques well known in the art for Internet communications. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions. The reward server computers 10,12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may freely navigate to any site by means well known in the art.

The present invention allows issuers who originally sold reward points in their program for use as an incentive by third parties to repurchase points at a substantial discount, thereby reducing their liability and allowing for a trading strategy that enables points to continually be sold and repurchased. This may be a separate accounting procedure than what is used for points that are granted.

Figure 5:
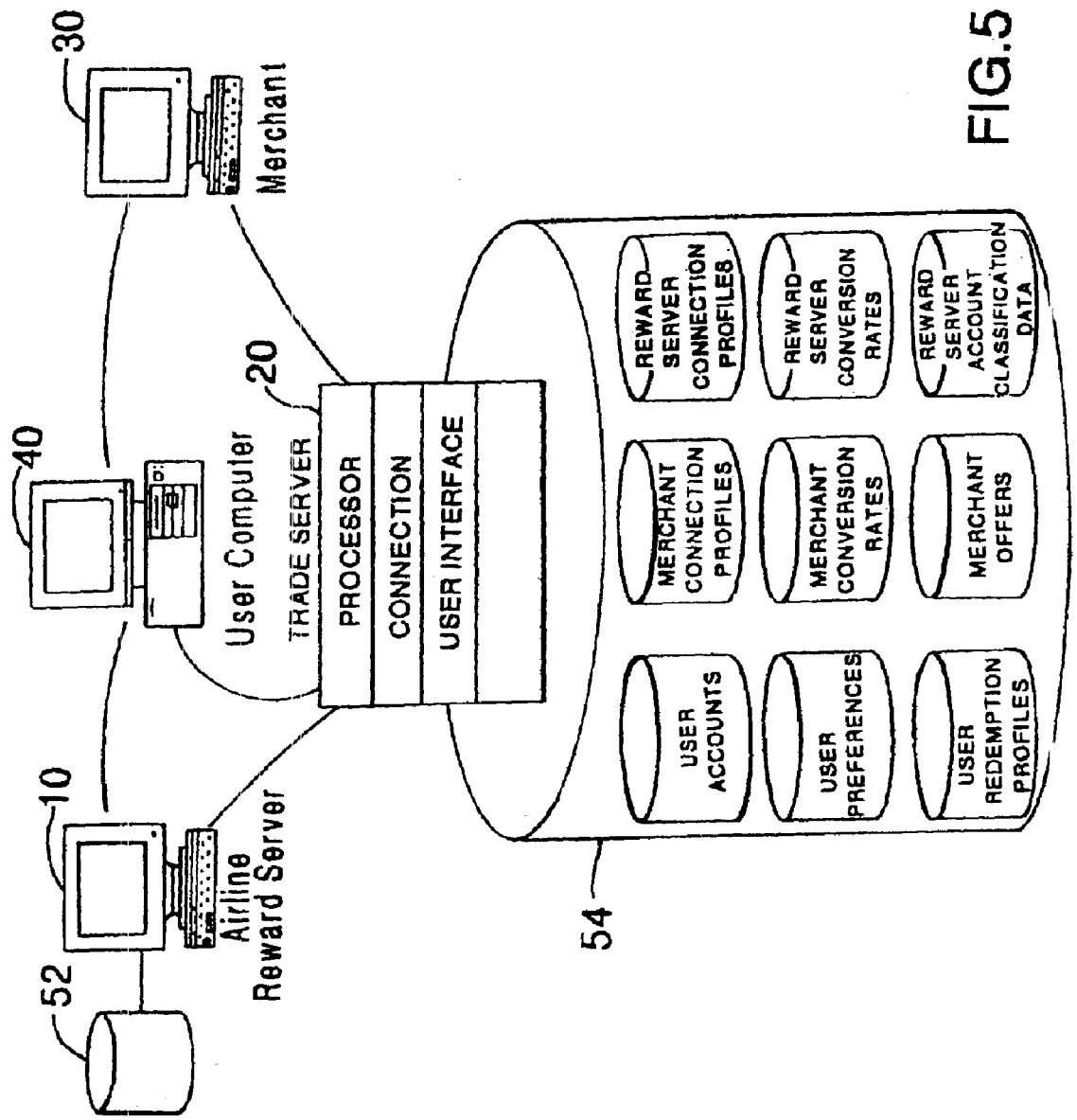
FIG. 5 is a block diagram of the system components of the present invention.
Figure 6:
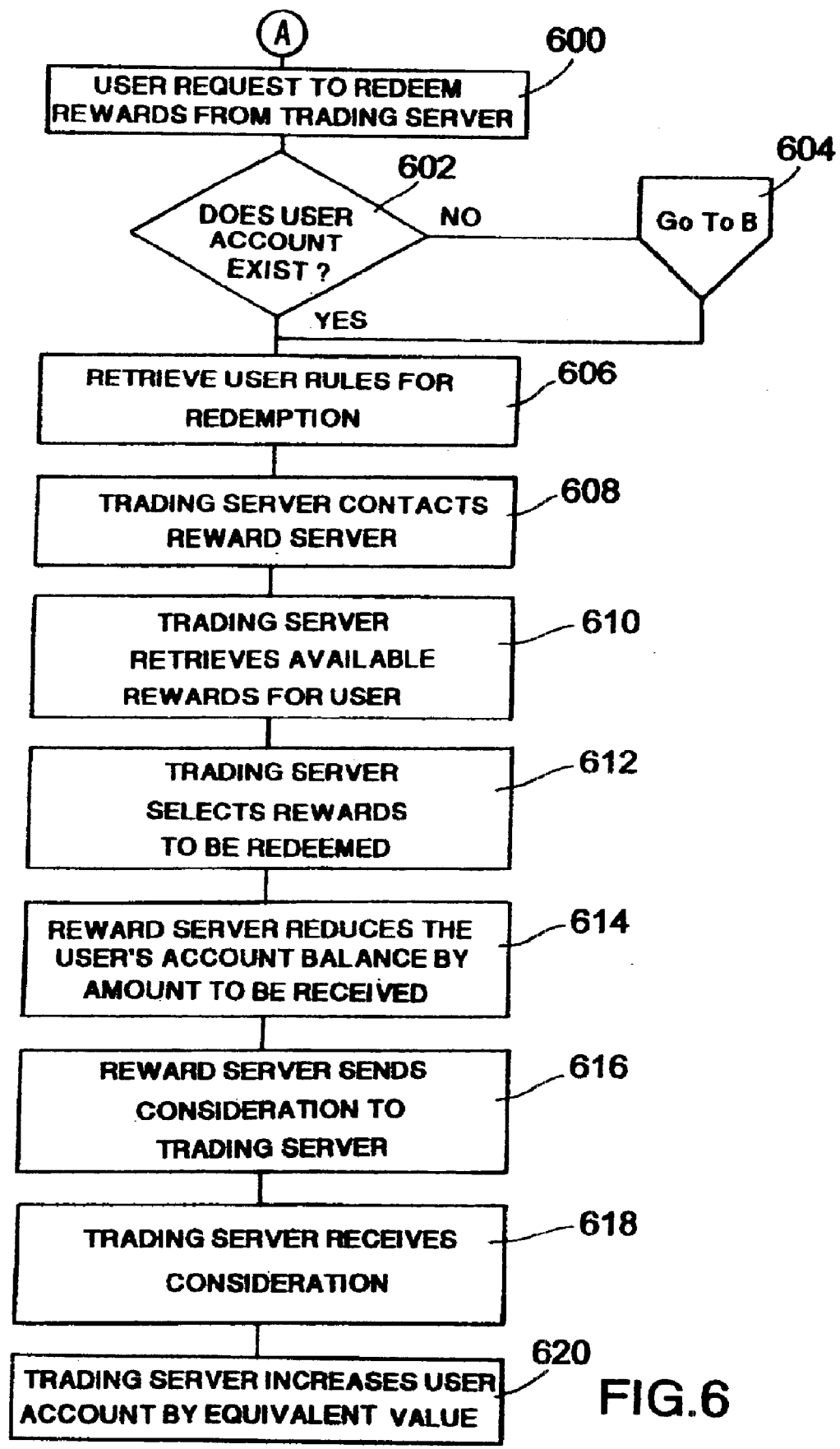
FIG. 6 is a data flow diagram of the process for a user to redeem rewards.

The method of allowing the user to redeem the accumulated reward points from one or more of a plurality of reward entities will now be described with respect to FIG. 4 and the data flow diagram of FIG. 6. The trading server system would allow users to "log in" to access the functionality provided where the user may interact with applications, forms or controls. For example, the user may view his account information by using a web browser to enter the appropriate identification information and then select buttons, links or other selectable objects to navigate to the part of the system desired. If the user does not yet have an account (step 602), then the user may be enrolled per the flow diagram of FIG. 8 (step 604) as discussed below. The user, from the user computer, makes a request to the trading server computer 20 via communications flow 102 (step 600), requesting redemption through the network 2 for a portion of the pre-accumulated reward points stored for the user in one of the rewarding entities. A user's reward point account 52 is associated with each of the reward servers but is only shown in FIG. 4 connected to the airline server for sake of clarity. Communications are made by the trading server 20 to the user computer 40 via communications data flows 104. The user may interactively select rewards to be redeemed, or the system may determine which rewards are to be redeemed based on a previously defined user profile rule (step 606). The trading server computer 20 "obtains" the reward points from a reward server 10, 12, 14 stored in the user's account 52 by contacting the appropriate reward server via communication flow 110 (step 608) according to the user's requirements, by using the connection parameters as defined in a database 54 on the trading server as shown in FIG. 5. In one embodiment, the trading server retrieves reward point account balance information via communications flow 114 (step 610) from the reward server for the user. In another embodiment, the trading server transfers as part of the communication 110, the requested reward mileage to be redeemed (step 612). The reward server computer 10 decreases the user's reward point account 52 by the requested number of reward points (step 614). The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10 (step 616). For example, the consideration may be in the form of a monetary credit to an account that exists between the trading server and the reward server, that gets paid at the end of a predefined billing cycle (i.e. every month). The trading server computer 20 increases the reward exchange account 54 associated with the user by the received number of points (step 620). The trading server computer 20 in turn, receives the consideration from the reward server computer 10 (step 618).

Similar communications are made between the trading server 20 and the credit card reward server 12, as indicated by the data communications 120 made by the trading server 20 to the credit card reward server 12 and the data communications 124 made by the credit card reward server 12 to the trading server 20. Likewise, communications are made between the trading server 20 and the marketing reward server 14, as indicated by the data communications 130 made by the trading server 20 to the marketing reward server 14 and the data communications 134 made by the marketing reward server 14 to the trading server 20. In each case, the trading server 20 increases the user's reward exchange account 54 by the received number of points from the credit card reward server 12 and the marketing reward server 14, respectively.

Figure 7:
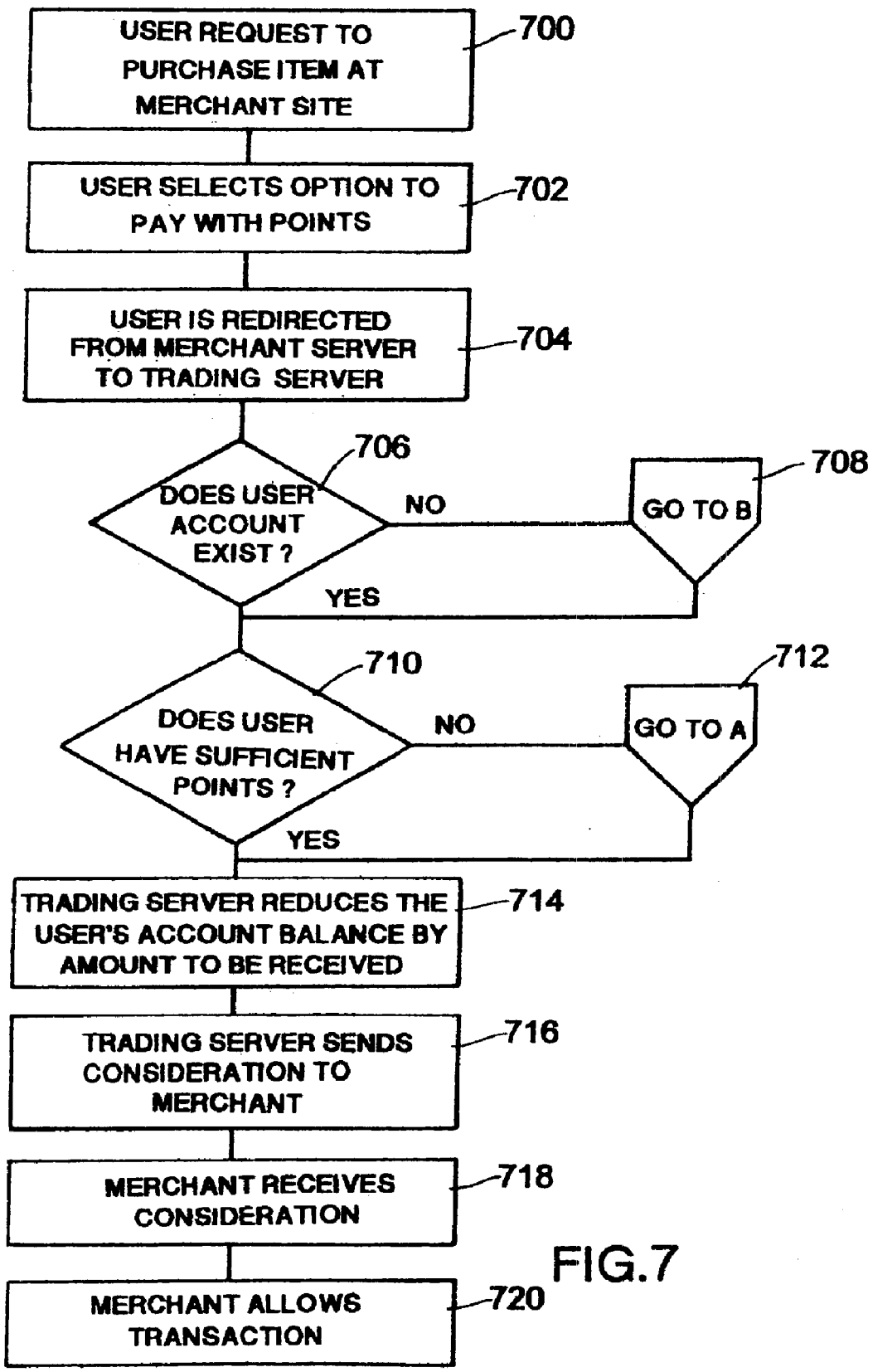
FIG. 7 is a data flow diagram of the user request for purchase of an item at a merchant site.

In the second part of the transaction (see FIG. 7), the user from a user computer 40 may make a request 150 to purchase an item from an associated merchant computer 30 (step 700). In the preferred embodiment, the merchant computer system will be a networked computer system accessible via the Internet. The user would visit the site by selecting on a link from the trading server's web site or by entering the name or address of the destination site. The user may identify one or many items to be acquired from one or several merchants 30. The user elects to pay for the desired item with points (step 702), and the user is "redirected" from the merchant server to the trading server at step 704. If the user does not have an account (step 706) then the user is enrolled per the flow diagram of FIG. 8 (step 708). The trading server computer 20 would confirm that the user has sufficient points to purchase the selected item by communicating with the trading server 20 via communication flows 140, 144 in order to check the user's reward exchange account 54 (step 710). If the user does not have enough points in his reward exchange account at the trading server 20, then the process of trading more points from the user's reward point account 52 into his reward exchange account 54 is executed by branching to the flow diagram at exit point A (step 712) which brings the process to the flow diagram in FIG. 6 discussed above. After enough points are traded, the user continues with the process from step 712 as shown in FIG. 7. The trading server computer 20 would request the merchant computer to deliver the item to the user. The user delivery information may be retrieved from the trading server computer 20 or may be supplied in some other manner. The trading server computer 20 would decrease the user exchange account 54 by the number of points corresponding to the purchased item (step 714). The trading server computer 20 conveys consideration to the merchant computer 30 equivalent to the cost of the item by means well known in the art of electronic commerce (e.g. by a preexisting account, credit card, etc.)(steps 716, 718). In the alternative, the consideration may be a direct transfer of points to an account associated with the merchant. The merchant then completes the transaction at step 720, for example by delivering the purchased item.

Policies and profiles may be established to automatically contact each of the reward servers according to a user redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process where the user may select how the transaction should proceed. If the user exhausts lower personal worth resources from the reward servers, the system may be required to contact the user before the transaction is allowed to proceed to redeem points. A classification system may also be used to indicate rewards of similar worth. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted.

FIG. 8 describes the process steps involved in enrolling a user to utilize the trader server. The user accesses the trading server 20 at step 800 and selects an option to create a user account at step 802. The data entered by the user may be used in determining whether a user allows unsolicited offers to be presented from the trading server. The user's preferences for manufactured goods services, products, travel destinations, hobbies, interests or any other user entered criteria may be stored in the database for subsequent use by the system (steps 804 and 808). The trading server has the ability to receive offers from reward servers or merchants (steps 806 and 808) which may then be directed to users based on the database profile information provided by the user (see FIG. 9). At step 900, the reward server contacts the trading server with an offer to redeem points. Similarly, a merchant may contact the trading server with an offer to be distributed to members (step 902). The trading server records the offer in a database (step 906), and the trading server may record a limited conversion rate in its database (step 906). The reward server may then contact the user with an offer to redeem at step 908. Optionally, the process may branch to the flow diagram in FIG. 6 discussed above (step 910).

The trading server may also be contacted in response to a button or hyperlink located on a web page accessible by the user from the airline reward server (FIG. 10, steps 1000 and 1002). The process may continue to that described with respect to FIG. 6 for trading points into a reward exchange account (step 1004). In a similar manner, hyperlinks or calling routines may allow a user to access a reservations system or merchant from the trading server. The link would direct the user to partner or associated air carriers where the points in a user exchange account on the trading server 20 may be used to acquire reduced fare flights.

The system used to implement the aforementioned method will now be disclosed with respect to FIG. 5. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules specified by the user, system, or merchant. The trading server also has communications means to allow users to access the server and to allow the trading server to contact reward servers and processing means to interpret the rules and coordinate the contact to the respective reward servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants.

In the preferred embodiment, the memory means comprises a database structure that is used to record the transactions associated with the previously described method.

Records indicating the changes and current value of user exchange accounts are updated according to the request processed by the processor.

In response to a request for redemption, the trading server looks up the contact properties of the reward server to be contacted. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action. In another embodiment, the trading server processor may be granted direct authorization to modify the user's records in the reward server database without analysis by the processor of the reward server. A conversion rate may be applied to the transaction such that the reward server reduces the available rewards in the user's account. The reward server then transfers consideration to the trading server that corresponds to the value reduced in the reward system. In response to the receipt of the transfer or approval of the transfer, the trading server increments the user account balance to reflect the received consideration and the connection to the reward server is dropped. A transaction log may be used to record each of the transactions in case a reconciliation process is required at a later time. The increase in the user's exchange account may then be stored until a user finds an item to be purchased.

The user selects the desired object from the merchants by indicating the type of product or service to be procured. In one embodiment, the trading server contacts the merchant server to return to the user a list of products that match the user's search criteria or if the user had specified in detail what was desired, the product may be directly acquired from a merchant. A communication link is established between the trading server and the merchant computer or designee for e-commerce. Direct acquisition may be enacted by contacting the merchant computer and supplying the user indicia, the product indicia, and the redemption value sufficient to secure the transaction. In response to the transaction request, the merchant computer will receive the consideration supplied and contract for the delivery of the product. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

Thus, the present invention provides a liability management system for issuers of reward points, which allows them to take points off the books and eliminate them, if desired, at a discount rate. This system enables the sale or repurchase of points with a trading strategy in which points need not expire.

The present system may be implemented by means of a smart card wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a vender associated with a computer connected to the Internet. The trading process proceeds as described above, except that the points are obtained directly from the smart rather than a reward server.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card is linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

The user can purchase points from the system, borrow points from the system, etc., and basically treat the points as cash consideration for purposes of such transactions.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected.

It is anticipated that high quality limited access products may benefit from the distribution methods afforded by this system. For example, companies like DeBeers and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets can have an associated diminishing or escalating value based on the length of the offer.

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

Other purchasing leverage not specifically addressed previously may also be acquired by combining the power of a pool of high profile users of this system where these users may be allocated access to products or services not generally distributed to the remainder of the system users. Points collected in the system by these users may afford them access to limited distribution channels where higher discount levels or premium luxury products may be acquired. Direct access to cartel products such as diamonds, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games may be afforded to the traveler where the availability of different games depends on the number of reward points traded in by the traveler. The rewards may be converted using the trading server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use.

In another aspect of the invention, an electronic bartering system is implemented, wherein product manufacturers, producers, distributors, etc. can provide surplus or overstocked goods for liquidation into the chain of supply of the system and exchange then for points as described herein. This provides an inventory management and liquidation system for these manufacturers and sellers.

In addition, the value of the reward points may fluctuate as a function of the company's performance, which may be measured by reference to the price of its stock, revenue, earnings, or some other parameter that is agreed to that reflects the relative performance of the company. In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the number of points otherwise earned by using its credit card. The value may also fluctuate as a function of the number of points outstanding or the desirability of the issuer to reduce its liability or make it more robust.

What is claimed is:

1. A method of operating a reward points accumulation and redemption program comprising the steps of:
   a) establishing a reward point account directly with each of a plurality of reward points issuing entities,
      wherein each of said reward point accounts is stored on a reward server associated with the reward point issuing entity, and
      wherein each of said reward point accounts tracks points earned by the user for transactions between the user and the associated reward points issuing entity, and
      wherein each of the reward points issuing entities enables the user to selectively redeem points from the reward point account associated with the user for an item selected by the user,
   b) earning reward points from each of the plurality of reward points issuing entities, each of said reward points issuing entities tracking the user's earned reward points in the user's reward point account stored on the rewards server associated with the reward points issuing entity,
   c) selectively designating at least some of said earned reward points from one or more of said user's reward point accounts for exchange into a reward exchange account on a host computing device selectively interoperative with each of the plurality of reward servers via a computing network, d) accumulating the designated earned reward points from said reward point accounts into the reward exchange account associated with the user, and e) redeeming accumulated points from the user's reward exchange account for use as consideration in a transaction.

2. The method of claim 1 in which the transaction comprises an item selected by the user in exchange for accumulated points from the user's reward exchange account.

3. The method of claim 1 wherein the step of redeeming accumulated points from the user's reward exchange account for use as consideration in a transaction is executed in a transaction with a merchant.

4. The method of claim 3 wherein the transaction further comprises the steps of
a user presenting a card to the merchant, wherein the card is associated with the user's reward exchange account;
using the card to link to the user's reward exchange account in order to perform the step of redeeming accumulated points from the user's reward exchange account.

5. The method of claim 4 wherein the card is a credit card.

6. The method of claim 4 wherein the card is a debit card.

7. The method of claim 4 wherein the card is a stored value card.

8. The method of claim 4 wherein the card is a smart card.

9. The method of claim 4 further comprising the step of using a credit card infrastructure with the card to link to the user's reward exchange account.

10. The method of claim 9 wherein the credit card infrastructure comprises the host computing device with the reward exchange account.

11. The method of claim 1 wherein reward points from the user's reward exchange account are used to completely pay for the item.

12. The method of claim 1 wherein reward points from the user's reward exchange account are used to partially pay for the item.

13. The method of claim 12 wherein cash is also used to partially pay for the item in addition to the reward points.

14. The method of claim 12 wherein credit is also used to partially pay for the item in addition to the reward points.

15. The method of claim 1 further comprising the step of the user designating which points are redeemed from the reward point account associated with the user.

16. The method of claim 1 further comprising the step of the user designating which accumulated points are redeemed from the user's reward exchange account.

17. The method of claim 1 further comprising the step of each reward issuing entity providing consideration to the host computing device in exchange for the host computing device accumulating the user's reward points from the reward point account into the reward exchange account.

18. The method of claim 1 wherein the step of designating at least some of said earned reward points from one or more of said user reward point accounts for exchange into the reward exchange account is performed by a user interfacing with the host computing device with a user-accessible computing device interconnected to the host computing device.

19. The method of claim 1 wherein the step of redeeming accumulated points from the user's reward exchange account for use as consideration in a transaction is performed by a user interfacing with the host computing device with a user-accessible computing device interconnected to the host computing device.

20. A reward points accumulation and redemption system comprising:

a. a plurality of reward servers,
   i. wherein each of said reward servers is associated with a reward points issuing entity, and
   ii. wherein each of said reward servers comprises data storage means for storing a plurality of reward point accounts,
   iii. wherein each of said reward point accounts is associated with a user and is configured to:
      1. track reward points earned by the associated user for transactions between the associated user and the associated reward point issuing entity; and
      2. enable the user to selectively redeem reward points from the reward point account associated with the user for an item selected by the user; and b. a host computing device selectively interoperative with each of the plurality of reward servers via a computer network,
   i. wherein the host computing device comprises data storage means for storing a plurality of reward exchange accounts, each of said reward exchange accounts associated with a user:
   ii. wherein the host computing device is configured to enable designation of at least some reward points from one or more of reward point accounts associated with the user for exchange into the reward exchange account associated with the user;
   iii. wherein the host computing device further comprises:
      1. means for accumulating the reward points designated from each of said reward point accounts associated with the user into the reward exchange account associated with the user, and
      2. means for allowing interaction with the host computing device to redeem accumulated reward points from the reward exchange account associated with the user for use as consideration in a transaction.

21. The system of claim 20 further comprising:
means for a merchant to enter indicia from a card presented by a user, the card being associated with the user's reward exchange account, in order to redeem accumulated points from the user's reward exchange account.

22. The system of claim 20 wherein the means for a merchant to enter indicia from a card presented by a user comprises means for a merchant to enter indicia from a credit card.

23. The system of claim 20 wherein the means for a merchant to enter indicia from a card presented by a user comprises means for a merchant to enter indicia from a debit card.

24. The system of claim 20 wherein the means for a merchant to enter indicia from a card presented by a user comprises means for a merchant to enter indicia from a stored value card.

25. The system of claim 20 wherein the means for a merchant to enter indicia from a card presented by a user comprises means for a merchant to enter indicia from a smart card.

26. The system of claim 20 wherein the means for a merchant to enter indicia from a card presented by a user is part of a credit card infrastructure.

27. The system of claim 26 wherein the host computing device is part of the credit card infrastructure.

28. The system of claim 20 further comprising a user-accessible computing device interconnected to the host computing device for designating at least some of the earned reward points from one or more of said user reward point accounts for exchange into the reward exchange account.

29. The system of claim 20 further comprising a user-accessible computing device interconnected to the host computing device for redeeming accumulated points from the user's reward exchange account for use as consideration in a transaction.

30. The system of claim 20 further comprising:
a user-accessible computing device interconnected to the network for allowing a user to select an item for purchase by linking from the host computing device over the network to an associated merchant computer for providing the item to the user from the merchant computer in exchange for consideration received from said host computing device
a merchant computer for providing the item to the user in exchange for consideration received from said host computing device, and
means for reducing the number of points in the user's reward exchange account in accordance with the consideration provided to the merchant computer.

31. The system of claim 20 further comprising:
a user-accessible computing device interconnected to the network for allowing a user to select an item for purchase from a list of available items from a merchant computer over the network for providing the item to the user from the merchant computer in exchange for consideration received from said host computing device;
a merchant computer for providing the item to the user in exchange for consideration received from said host computing device, and
means for reducing the number of points in the user's reward exchange account in accordance with the consideration provided to the merchant computer.

32. The system of claim 20 further comprising a user-accessible computing device interconnected to the network for allowing a user to interface with the host computing device and designate at least some of said user earned reward points from one or more of said user reward point accounts for exchange into the reward exchange account.

33. The system of claim 20 further comprising a user-accessible computing device interconnected to the network for allowing a user to interface with the host computing device to redeem accumulated points from the user's reward exchange account.

34. A method of operating a reward points accumulation and redemption program comprising the steps of:
a) establishing a reward point account directly with each of a plurality of reward points issuing entities,
wherein each of said reward point accounts is stored on a reward server associated with the reward point issuing entity, and wherein each of said reward point accounts tracks points earned by the user for transactions between the user and the associated reward points issuing entity, and
wherein each of the reward points issuing entities enables the user to selectively redeem points from the reward point account associated with the user for an item selected by the user,
b) earning reward points from each of the plurality of reward points issuing entities, each of said reward points issuing entities tracking the user's earned reward points in the user's reward point account stored on the rewards server associated with the reward points issuing entity,
c) selecting an item for purchase from a merchant with a combination of earned reward points obtained from a plurality of different reward point accounts stored on different rewards servers
d) designating at least some of said earned reward points from each of a plurality of said user's reward point accounts for redemption for said item selected for purchase, and
e) combining the user's designated earned reward points from each of said designated reward point accounts for redemption for said item selected for purchase.

35. The method of claim 34 wherein each of said reward point accounts is linked to a card associated with the user, and wherein the merchant uses each card associated with each reward point account designated by the user for redemption for said item in order to access said designated reward points to redeem for said purchased item.

36. The method of claim 35 wherein at least one of said cards is a credit card.

37. The method of claim 35 wherein at least one of said cards is a debit card.

38. The method of claim 35 wherein at least one of said cards is a stored value card.

39. The method of claim 35 wherein at least one of said cards is a smart card.

40. The method of claim 35 in which the purchase may be accomplished with a combination of designated reward points from the user's reward point accounts and other consideration.

41. The method of claim 35 further comprising the step of each reward issuing entity providing consideration to the merchant in exchange for the merchant redeeming the user's reward points from the reward point account for the selected item.

42. A reward points accumulation and redemption system comprising:
a. a plurality of reward servers,
i. wherein each of said reward servers is associated with a reward points issuing entity, and
ii. wherein each of said reward servers comprises data storage means for storing a plurality of reward point accounts,
iii. wherein each of said reward point accounts is associated with a user and is configured to:
1. track reward points earned by the associated user for transactions between the associated user and the associated reward point issuing entity; and
2. enable the user to selectively redeem reward points from the reward point account associated with the user for an item selected by the user; and
iv. wherein each of said reward point accounts is linked to a card associated with the user; and
b. apparatus adapted to allow a merchant to execute a purchase transaction with a user, wherein the user selects an item for purchase from a merchant with a combination of earned reward points obtained from a plurality of different reward point accounts stored on different rewards servers, and wherein the user designates at least some of said earned reward points from each of a plurality of said user's reward point accounts for redemption for said item selected for purchase,
and wherein a user designates at least some of said reward points from each of a plurality of said user's reward point accounts for redemption for said item selected for purchase;

wherein the apparatus further comprises means for combining the user's designated reward points from each of said designated reward point accounts for redemption for said item selected for purchase.

43. The system of claim 42 wherein each of said reward point accounts is linked to a card associated with the user, and wherein the merchant uses each card associated with each reward point account designated by the user for redemption for said item in order to access said designated reward points to redeem for said purchased item.

44. The system of claim 43 wherein at least one of said cards is a credit card.

45. The system of claim 43 wherein at least one of said cards is a debit card.

46. The system of claim 43 wherein at least one of said cards is a stored value card.

47. The system of claim 43 wherein at least one of said cards is a smart card.

48. The system of claim 42 in which the purchase may be accomplished with a combination of designated reward points from the user's reward point accounts and other consideration.

* * * * *